United States Patent Office 2,701,750
Patented Feb. 8, 1955

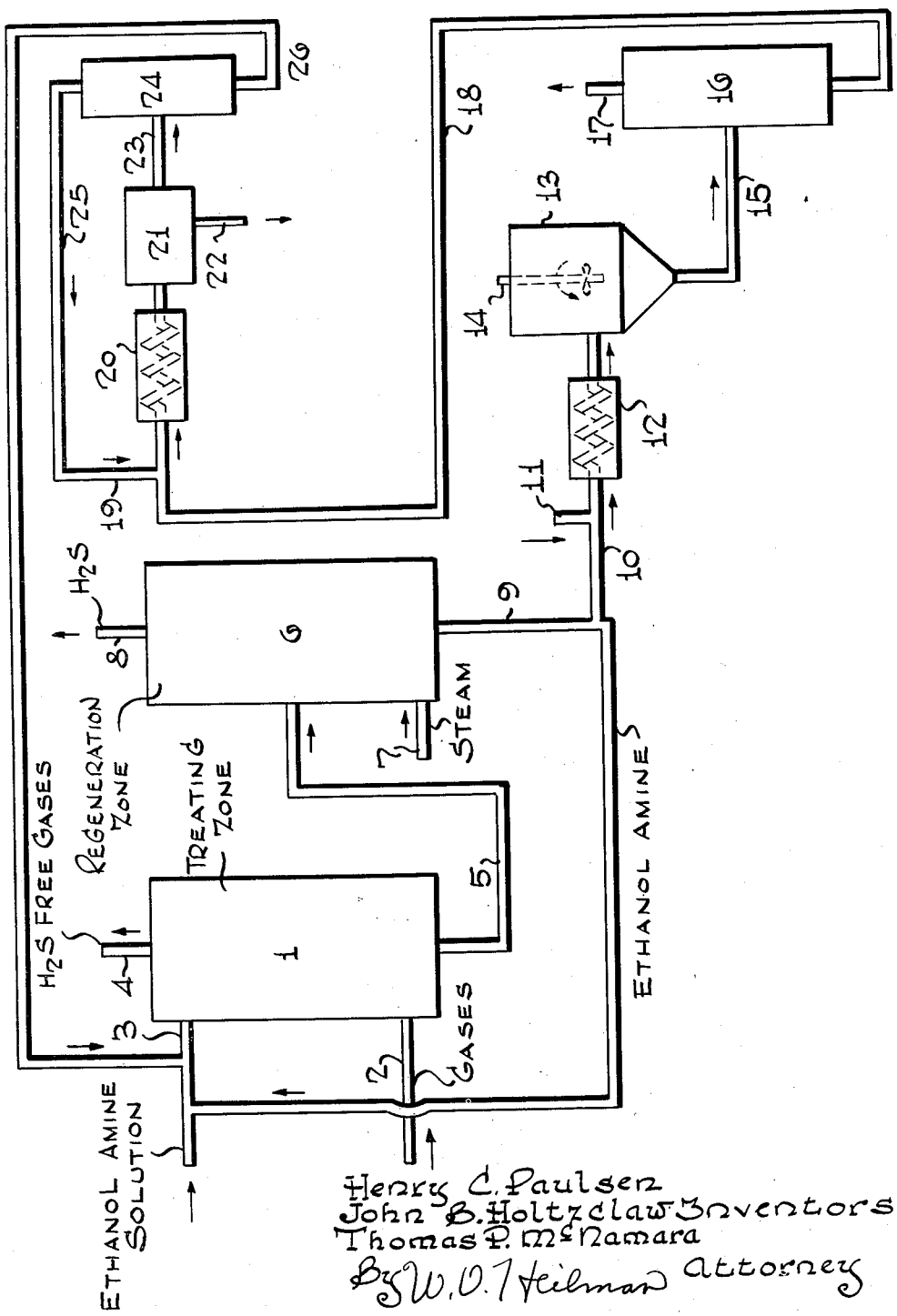

2,701,750

RECOVERY OF DIETHANOLAMINE AND SALTS

Henry C. Paulsen, Elizabeth, John B. Holtzclaw, Roselle, and Thomas P. McNamara, Elizabeth, N. J., assignors to Standard Oil Development Company, a corporation of Delaware Application May 20, 1952, Serial No. 288,977

9 Claims. (Cl. 23—2.3)

The present invention is concerned with an improved process for removing sulfur compounds, particularly hydrogen sulfide from gases containing the same utilizing an ethanolamine solvent. The invention is more particularly concerned with an improved process for the regeneration and revivification of the ethanolamine solvent.

It is well known in the art to treat hydrogen sulfide containing gases with an ethanolamine solvent. These conventional operations are usually carried out at temperatures in the range from about 95° F. to 110° F. and at pressures in the range from about 125 to 130 lbs. per sq. in. The volume of ethanolamine solvent used per volume of gas usually depends upon the hydrogen sulfide content of the gas. In these operations the ethanolamine solution is withdrawn from the bottom of the contacting zone and subjected to steam treatment for the removal of hydrogen sulfide therefrom. The stripped diethanolamine is recycled to the treating zone.

However, in many operations some of the gas streams contain substances which form organic acids, such as formic acid, acetic acid, and thiocyanic acid. These organic acids combine with diethanolamine and render it inactive. Upon subsequent steam treatment for the removal of hydrogen sulfide from the ethanolamine solution, these acid reaction compounds remain in the ethanolamine solution as ethanolamine salts and cause a progressive decrease in the hydrogen sulfide absorption efficiency of the ethanolamine solution. Heretofore, steps have been taken to partially counteract this by regenerating the diethanolamine salts of these organic acids with sodium hydroxide. However, the resulting sodium salts of the acid likewise, remain dissolved in the ethanolamine solution. The presence of these sodium salts of the organic acids increase the viscosity of the ethanolamine solution which decreases the absorption efficiency of the ethanolamine solution for the hydrogen sulfide. For instance, when the viscosity of the ethanolamine solution exceeds about 40 Saybolt seconds universal at 100° F., it is necessary to discard the solution.

In accordance with the present invention, the ethanolamine solution is regenerated and revivified by treating the spent solution with a caustic solution such as sodium or potassium hydroxide followed by substantially dehydrating the solution. The dehydrated solution is contacted with a selective solvent preferably isopropyl alcohol which dissolves the ethanolamine. The mixture is filtered to remove the sodium salts and distilled to segregate the alcohol from the ethanolamine.

The process of the present invention may be more fully understood by reference to the drawing illustrating one embodiment of the same. Referring specifically to the drawing, a gas containing undesirable hydrogen sulfide constituents is introduced into countercurrent treating zone 1 by means of line 2. The gas flows upwardly in zone 1 and contacts downflowing ethanolamine solution which is introduced into the upper area of zone 1 by means of line 3. The temperature in zone 1 is in the range from about 95° F. to 110° F., while the pressure is in the range from about 125 to 130 lbs. per sq. in. A gas substantially free of hydrogen sulfide is removed overhead from zone 1 by means of line 4.

The ethanolamine solution containing the absorbed hydrogen sulfide is removed from the bottom of zone 1 by means of line 5 and introduced into regeneration zone 6. Temperatures in regeneration zone 6 are in the range from about 250° F. to 260° F., while the pressures are in the range from about 15 to 20 lbs. per sq. in. Steam is introduced into the bottom of zone 6 by means of line 7. Steam and hydrogen sulfide are removed overhead from zone 6 by means of line 8. The ethanolamine solution free of hydrogen sulfide is withdrawn from the bottom of zone 6 by means of line 9 and generally recycled to zone 1. It is to be understood that zone 1 and zone 6 may comprise any suitable number and arrangement of stages.

As pointed out heretofore, the feed gases introduced by means of line 2 contain substances which form organic acids such as formic, acetic, and thiocyanic acids. These acids react with the ethanolamine and remain dissolved in the regenerated solution withdrawn by means of line 9. In accordance with the present invention, at least a portion of the ethanolamine solution withdrawn from the bottom of zone 6 is segregated by means of line 10. A caustic solution having a concentration in the range from about 5 weight-percent to 30 weight-percent, preferably in the range from about 10 weight-percent to 20 weight-percent, is introduced into line 10 by means of line 11. The amount of caustic introduced will depend on the quantity of ethanolamine combined as organic salts.

The solution is passed through a heating zone 12 wherein the temperature is raised to a temperature preferably in the range from about 100° F. to 180° F. The heated solution is then introduced into mixing zone 13 wherein satisfactory mixing is secured by means of stirrer 14 or equivalent means. The solution is withdrawn from the bottom of mixing zone 13 by means of line 15 and introduced into a distillation zone 16 wherein temperature and pressure conditions are adjusted to remove water overhead by means of line 17. In zone 16, substantially 80 to 95 volume percent of the water is removed from the solution.

A substantially dehydrated mixture having less than about 10 volume percent of water, preferably less than about 5 volume percent of water is withdrawn from the bottom of distillation zone 16 by means of line 18 and mixed with an alcohol as for example, 99 volume percent alcohol. The alcohol is preferably isopropyl alcohol having less than about 1 volume percent of water dissolved therein, and preferably less than about 0.5 volume percent of water dissolved therein. The alcohol is introduced into line 18 by means of line 19.

The mixture is passed through a filtering zone 21 wherein the solid organic salts of sodium or potassium are removed by means of line 22. It is to be understood that zone 21 may comprise any suitable means for the separation of solids from liquid, as for example centrifuges and the like. The alcohol-ethanolamine solution is removed by means of line 23 and passed to a separation zone 24. Temperature and pressure conditions in zone 24 are adapted to remove overhead by means of line 25 the alcohol which is preferably recycled to line 19. The regenerated ethanolamine solution is removed from the bottom of zone 24 by means of line 26 and preferably recycled to zone 1.

The invention is broadly concerned with a more efficient use of an ethanolamine solution for the removal of hydrogen sulfide from gases. The invention is particularly directed toward the regeneration of the ethanolamine solution when the feed gases contain substances which form organic acids, as for example, formic and thiocyanic acids and the like. In accordance with the present invention, the steamed ethanolamine solution is mixed with caustic, dehydrated, mixed with alcohol, filtered and distilled. By this procedure the ethanolamine solution is rendered essentially free of undesirable salts of organic acids. Preferred caustic solutions comprise sodium or potassium hydroxide. Satisfactory alcohols are for example, low molecular weight alcohols having 5 or less carbon atoms in the molecule. While alcohols as for example, methyl alcohol, ethyl alcohol and butyl alcohol can be utilized, the preferred alcohol comprises isopropyl alcohol. The amount of alcohol used is in the range from about .5 to 3 volumes of alcohol per volume of dehydrated solution.

The process of the present invention may be more fully understood by the following example illustrating the same:

EXAMPLE

A diethanolamine solution used for the removal of hydrogen sulfide from feed gases containing organic acids, had the following inspections:

Spent DEA solution

| | |
|---|---|
| Specific gravity at 60° F | 1.22 |
| SSU viscosity at 100° F | 42 |
| Total diethanolamine_____weight percent | 42.3 |
| Free diethanolamine_____do | 22.6 |
| Combined diethanolamine_____do | 19.7 |

From the above it is apparent that 19.7% of the diethanolamine had formed salts, hereby increasing the viscosity to 42 which rendered the solution unsatisfactory.

Approximately 500 grams of the spent DEA solution was mixed with 25 grams of sodium hydroxide. This mixture was distilled to remove 220 grams of water. This represented approximately 95 volume percent of water removable. The residue after removal of the water comprised 280 grams of salts and amines. This residue was mixed with 400 grams of 99% of isopropyl alcohol after which the mixture was filtered to remove alkali organic salts and the DEA recovered by distillation. A summary of the operating conditions are as follows:

Operating conditions for the DEA recovery process

| | |
|---|---|
| Spent DEA solution used_____g | 500 |
| Sodium hydroxide (calculated from combined amine)_____g | 25 |
| Water removed by distillation_____g | 220 |
| Residue of salts and amine_____g | 280 |
| 99% isopropyl alcohol used_____g | 400 |
| Agitation time on adding caustic_____min | 15 |
| Temperature of treatment with caustic_____° F | 80 |
| Distillation temperature to_____° F | 230 |
| Cooled to_____° F | 70 |
| Salts obtained on filtration_____g | 92 |
| Diethanolamine from filtrate_____g | 188 |
| Available DEA recovered_____weight percent | 90 |

Analysis of the recovered DEA and organic salts are as follows:

Analysis of recovered DEA

| | Weight percent |
|---|---|
| Free diethanolamine | 92.8 |
| Thio cyanates, ferrocyanides etc. | 7.2 |

Analysis of recovered salts

| | Weight percent |
|---|---|
| Sodium formate | 75 |
| Sodium carbonate | 4 |
| DEA and other compounds | 21 |

Purified diethanolamine diluted to plant concentration

| | |
|---|---|
| Total diethanolamine_____weight percent | 28.0 |
| Free diethanolamine_____do | 25.4 |
| SSU viscosity at 100° F | 32 |
| Specific gravity at 70° F | 1.050 |

What is claimed is:

1. An improved process for the removal of hydrogen sulfide from gases containing hydrogen sulfide and organic acids which comprises contacting said gases with an ethanolamine solution whereby said hydrogen sulfide and said organic acids combine with the ethanolamine, steam stripping the resulting ethanolamine solution whereby hydrogen sulfide is recovered from the solution, segregating at least a portion of the stripped solution, contacting the segregated portion with a caustic solution selected from the class consisting of potassium hydroxide and sodium hydroxide in about 5 to 30 weight percent concentration in an amount to convert to the corresponding metal salts substantially all of said organic acids and to regenerate substantially all of the ethanolamine in said portion, removing 80 to 95% of the water from said portion, contacting the dehydrated portion with about 0.5 to 3 volumes of alcohol per volume of said dehydrated portion to selectively dissolve the ethanolamine and to form an alcohol ethanolamine solution, said alcohol containing less than 6 carbon atoms, separating undissolved organic acid metal salts from the alcohol-ethanolamine solution and distilling the separated solution to segregate the alcohol from the ethanolamine.

2. Method as defined in claim 1 in which the caustic solution has a concentration of between 10 and 20 weight percent of the hydroxide.

3. Method as defined in claim 2 in which the caustic contacted portion is dehydrated until it contains less than 10 volume percent water.

4. Method as defined in claim 2 in which the caustic contacted portion is dehydrated until it contains less than 5 volume percent water.

5. Method as defined in claim 2 in which the alcohol is 99 volume percent alcohol.

6. Method as defined in claim 3 in which the alcohol is isopropyl alcohol.

7. Method as defined in claim 4 in which the isopropyl alcohol has less than 0.5 volume percent water.

8. Method as defined in claim 6 in which the caustic is caustic potash.

9. Method as defined in claim 6 in which the caustic is caustic soda.

References Cited in the file of this patent

UNITED STATES PATENTS

| | | |
|---|---|---|
| Re. 18,958 | Bottoms | Sept. 26, 1933 |
| 1,911,479 | Heath et al. | May 23, 1933 |
| 2,007,166 | Hund et al. | July 9, 1935 |
| 2,128,027 | Clark | Aug. 23, 1938 |
| 2,311,342 | Kerns | Feb. 16, 1943 |

OTHER REFERENCES

MacArdle: "Solvents in Syn. Org. Chem." (1925), Van Nostrand Co., page 49.

Garadin: "Annales de Chemie et de Physique," Series 4, vol. 5 (1865), page 158.